US012749676B2

(12) United States Patent
Endo et al.

(10) Patent No.: US 12,749,676 B2
(45) Date of Patent: Sep. 29, 2026

(54) POSITIVE ACTIVE MATERIAL FOR ENERGY STORAGE DEVICE, POSITIVE ELECTRODE FOR ENERGY STORAGE DEVICE, ENERGY STORAGE DEVICE, AND ENERGY STORAGE APPARATUS

(71) Applicant: GS Yuasa International Ltd., Kyoto (JP)

(72) Inventors: Daisuke Endo, Kyoto (JP); Shinya Otani, Kyoto (JP); Satoshi Hoshino, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 687 days.

(21) Appl. No.: 18/034,913

(22) PCT Filed: Oct. 4, 2021

(86) PCT No.: PCT/JP2021/036545
§ 371 (c)(1),
(2) Date: May 2, 2023

(87) PCT Pub. No.: WO2022/097400
PCT Pub. Date: May 12, 2022

(65) Prior Publication Data

US 2024/0021794 A1 Jan. 18, 2024

(30) Foreign Application Priority Data

Nov. 6, 2020 (JP) ................................ 2020-186176

(51) Int. Cl.

| | |
|---|---|
| ***H01M 4/36*** | (2006.01) |
| ***C01B 25/45*** | (2006.01) |
| ***H01G 11/32*** | (2013.01) |
| ***H01G 11/46*** | (2013.01) |
| ***H01M 4/02*** | (2006.01) |
| ***H01M 4/133*** | (2010.01) |

(Continued)

(52) U.S. Cl.
CPC ............ *H01M 4/366* (2013.01); *C01B 25/45* (2013.01); *H01G 11/32* (2013.01); *H01G 11/46* (2013.01);
(Continued)

(58) Field of Classification Search
CPC .. C01B 25/45; C01P 2006/14; C01P 2006/40; H01G 11/06; H01G 11/26;
(Continued)

(56) References Cited

U.S. PATENT DOCUMENTS 7,618,747 B2 11/2009 Audemer et al.
7,858,233 B2 12/2010 Song et al.
(Continued)

FOREIGN PATENT DOCUMENTS

CN 104037413 A * 9/2014 ........ H01M 10/0525
CN 108321361 A 7/2018
(Continued)

OTHER PUBLICATIONS

International Search Report (ISR) dated Dec. 7, 2021 filed in PCT/JP2021/036545.

*Primary Examiner* — Daniel S Gatewood
(74) *Attorney, Agent, or Firm* — RANKIN, HILL & CLARK LLP

(57) ABSTRACT

In a positive active material for energy storage device according to an aspect of the present invention, at least part of a surface is coated with carbon, a ratio of full width at half maximum of a peak in a charged state to a peak in a discharged state is 0.85 or more and 1.13 or less in a peak corresponding to a (131) plane observed by powder X-ray diffraction using CuKα radiation, and the positive active material for energy storage device is a compound represented by the following Formula 1.

$LiFe_xMn_{(1-x)}PO_4$ $(0 \leq x \leq 1)$ 1

7 Claims, 3 Drawing Sheets

(51) Int. Cl.
*H01M 4/136* (2010.01)
*H01M 4/58* (2010.01)
*H01M 4/587* (2010.01)

(52) U.S. Cl.
CPC ........... *H01M 4/133* (2013.01); *H01M 4/136* (2013.01); *H01M 4/5825* (2013.01); *H01M 4/587* (2013.01); *C01P 2006/14* (2013.01); *C01P 2006/40* (2013.01); *H01M 2004/021* (2013.01); *H01M 2004/028* (2013.01)

(58) Field of Classification Search
CPC ........ H01G 11/32; H01G 11/46; H01G 11/50; H01M 4/133; H01M 4/136; H01M 4/36; H01M 4/366; H01M 4/585825; H01M 4/587; H01M 4/625; H01M 2004/021; H01M 2004/028; H01M 10/052; H01M 10/0525; Y02E 60/10
See application file for complete search history.

(56) References Cited

U.S. PATENT DOCUMENTS

| | | | |
|---|---|---|---|
| 7,923,154 | B2 | 4/2011 | Audemer et al. |
| 8,236,453 | B2 | 8/2012 | Audemer et al. |
| 8,524,396 | B2 | 9/2013 | Sano |
| 2006/0035150 | A1 | 2/2006 | Audemer et al. |
| 2009/0072203 | A1 | 3/2009 | Audemer et al. |
| 2010/0028777 | A1 | 2/2010 | Ueda et al. |
| 2010/0183924 | A1 | 7/2010 | Song et al. |
| 2010/0233541 | A1 | 9/2010 | Sano |
| 2011/0212365 | A1 | 9/2011 | Audemer et al. |
| 2012/0021288 | A1 | 1/2012 | Song et al. |

FOREIGN PATENT DOCUMENTS

| | | | | |
|---|---|---|---|---|
| JP | 2005-530676 | A | | 10/2005 |
| JP | 2008-34306 | A | | 2/2008 |
| JP | 2009218205 | A | * | 9/2009 |
| JP | 2010-40272 | A | | 2/2010 |
| JP | 2010-218838 | A | | 9/2010 |
| JP | 2011-253631 | A | | 12/2011 |
| JP | 2012-516016 | A | | 7/2012 |
| JP | 2012-155916 | A | | 8/2012 |
| JP | 2016-72028 | A | | 5/2016 |
| JP | 2019-139982 | A | | 8/2019 |
| JP | 2019-149356 | A | | 9/2019 |
| JP | 2021-51909 | A | | 4/2021 |
| WO | 2015170561 | A1 | | 11/2015 |

* cited by examiner

POSITIVE ACTIVE MATERIAL FOR ENERGY STORAGE DEVICE, POSITIVE ELECTRODE FOR ENERGY STORAGE DEVICE, ENERGY STORAGE DEVICE, AND ENERGY STORAGE APPARATUS

TECHNICAL FIELD

The present invention relates to a positive active material for energy storage device, a positive electrode for energy storage device, an energy storage device, and an energy storage apparatus.

BACKGROUND ART

Nonaqueous electrolyte secondary batteries typified by lithium ion secondary batteries are widely used for electronic devices such as personal computers and communication terminals, motor vehicles, and the like since these secondary batteries have a high energy density. The nonaqueous electrolyte secondary batteries generally include a pair of electrodes, which are electrically separated from each other by a separator, and a nonaqueous electrolyte interposed between the electrodes, and are configured to allow ions to be transferred between the two electrodes for charge-discharge. Capacitors such as lithium ion capacitors and electric double-layer capacitors are also widely in use as energy storage devices except for the nonaqueous electrolyte secondary batteries.

In recent years, an olivine-type positive active material, which is inexpensive and highly safe, has attracted attention as a positive active material used in the energy storage device. Since this olivine-type positive active material has low electron conductivity, it is difficult to obtain a discharge capacity close to the theoretical capacity, but a technique of coating a surface with carbon for improving the electron conductivity has been proposed (see Patent Document 1).

As a method of producing a positive active material, a production method using a precursor has been proposed in, for example, so-called ternary lithium-transition metal composite oxide positive active materials (see Patent Document 2).

PRIOR ART DOCUMENT

Patent Document

Patent Document 1: JP-A-2008-034306
Patent Document 2: JP-A-2021-051909

SUMMARY OF THE INVENTION

Problems to be Solved by the Invention

However, since such an olivine-type positive active material coated with carbon has a large specific surface area, an energy storage device containing such a positive active material is likely to undergo an increase in resistance after being stored in a high temperature environment, and may have a decreased power retention ratio.

In the case of obtaining an olivine-type positive active material coated with carbon by a production method using a precursor, it has been difficult to control the crystal growth direction of the positive active material and to acquire sufficient characteristics as a positive active material.

The present invention has been made in view of the above circumstances, and an object thereof is to provide a positive active material for energy storage device capable of diminishing an increase in resistance of an energy storage device and an energy storage apparatus after being stored in a high temperature environment.

Means for Solving the Problems

In a positive active material for energy storage device according to an aspect of the present invention, at least part of a surface is coated with carbon, a ratio of full width at half maximum of a peak in a charged state to a peak in a discharged state is 0.85 or more and 1.13 or less in a peak corresponding to a (131) plane observed by powder X-ray diffraction using CuKα radiation, and the positive active material for energy storage device is a compound represented by the following Formula 1.

$$LiFe_xMn_{(1-x)}PO_4 (0 \leq x \leq 1) \quad 1$$

Advantages of the Invention

The positive active material for energy storage device according to an aspect of the present invention can diminish an increase in resistance of an energy storage device and an energy storage apparatus after being stored in a high temperature environment.

MODE FOR CARRYING OUT THE INVENTION

Figure 1:
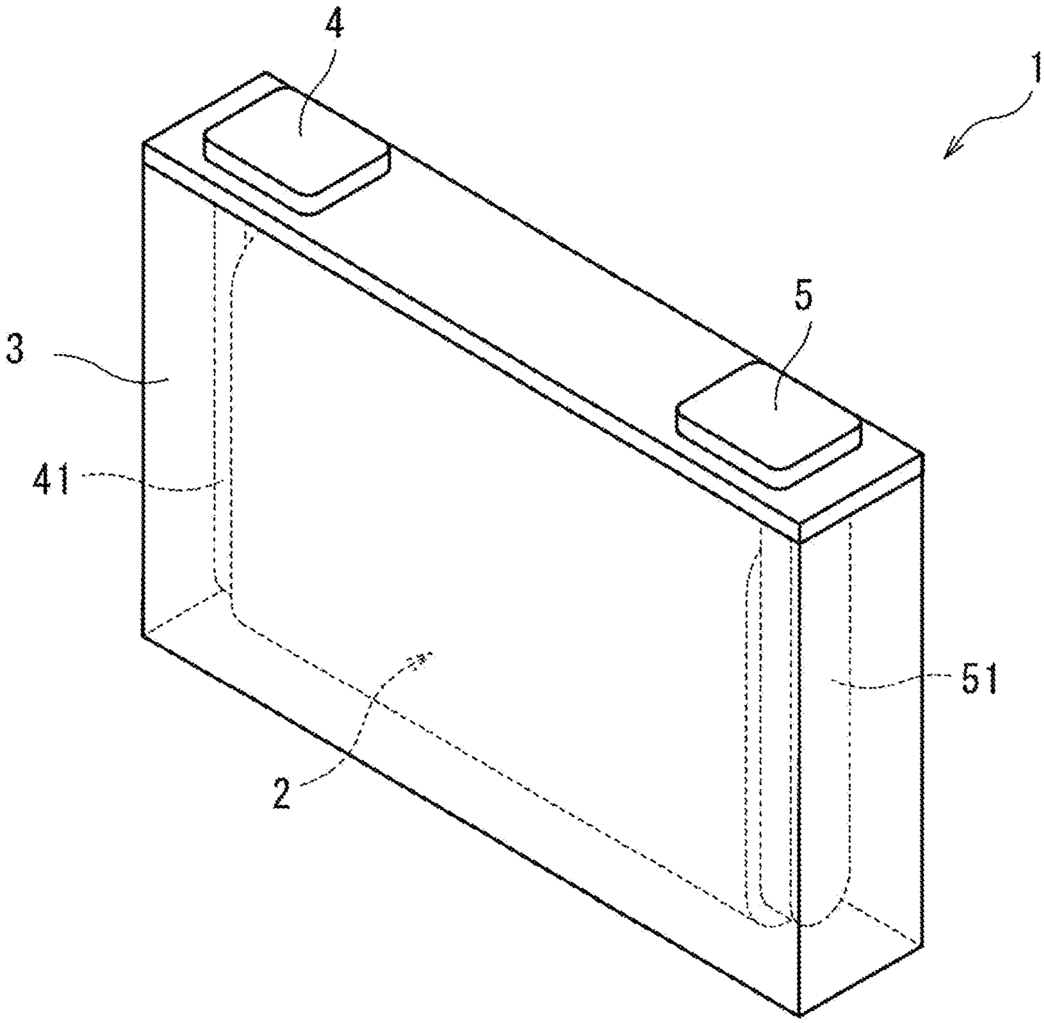
FIG. 1 is a see-through perspective view illustrating an embodiment of an energy storage device.

First, outlines of a positive active material for energy storage device, a positive electrode for energy storage device, an energy storage device, and an energy storage apparatus disclosed by the present specification will be described.

In a positive active material for energy storage device according to an aspect of the present invention, at least part of a surface is coated with carbon, a ratio of full width at half maximum of a peak in a charged state to a peak in a discharged state is 0.85 or more and 1.13 or less in a peak corresponding to a (131) plane observed by powder X-ray diffraction using CuKα radiation, and the positive active material for energy storage device is a compound represented by the following Formula 1.

$$LiFe_xMn_{(1-x)}PO_4 (0 \leq x \leq 1) \quad 1$$

In the positive active material for energy storage device, at least part of the surface is coated with carbon, the positive active material for energy storage device is a compound represented by Formula 1, and the ratio of full width at half maximum of the peak in a charged state to the peak in a discharged state is in a specific range in the peak corresponding to the (131) plane observed by powder X-ray diffraction using CuKα radiation, and thus the positive active material for energy storage device can diminish an increase in resistance of an energy storage device after being stored in a high temperature environment. The reason for this is presumed as follows. As described above, since an olivine-type positive active material coated with carbon has a large specific surface area, an energy storage device containing such a positive active material is likely to undergo an increase in resistance after being stored in a high temperature environment. The present inventors have found out that in an energy storage device containing an olivine-type positive active material coated with carbon, deterioration in current collection is likely to occur and this is likely to lead to a further increase in resistance particularly if the anisotropic expansion that occurs when the positive active material changes from a discharged state to a charged state is large. Moreover, it has been ascertained that an effect of suppressing an increase in resistance of an energy storage device after being stored in a high temperature environment can be exhibited by suppressing the anisotropic expansion of the positive active material. In the positive active material for energy storage device, although at least part of the surface is coated with carbon, since the ratio of full width at half maximum of the peak in a charged state to the peak in a discharged state is or more and 1.13 or less in the peak corresponding to the (131) plane observed by powder X-ray diffraction using CuKα radiation, the anisotropic expansion that occurs when the positive active material changes from a discharged state to a charged state is suppressed. As a result, it is presumed that current collecting performance of the positive electrode can be favorably maintained. Consequently, the positive active material for energy storage device can diminish an increase in resistance of an energy storage device after being stored in a high temperature environment.

The ratio of full width at half maximum of the positive active material for energy storage device is preferably 0.85 or more and 1.10 or less. As the ratio of full width at half maximum is 0.85 or more and 1.10 or less, it is possible to further diminish an increase in resistance of the energy storage device after being stored in a high temperature environment.

The positive electrode for energy storage device according to an aspect of the present invention includes a positive composite layer containing the positive active material. As the positive electrode for energy storage device includes a positive composite layer containing the positive active material, it is possible to diminish an increase in resistance of the energy storage device after being stored in a high temperature environment.

In the positive electrode for energy storage device, the peak differential pore volume of the positive composite layer is preferably $5\times10^{-3}$ $cm^3/(g\ nm)$ or more and $8\times10^{-3}$ $cm^3/(g\ nm)$ or less. As the peak differential pore volume of the positive composite layer is $5\times10^{-3}$ $cm^3/(g\ nm)$ or more and $8\times10^{-3}$ $cm^3/(g\ nm)$ or less, it is possible to diminish an increase in resistance of the energy storage device after being stored in a high temperature environment.

The energy storage device according to an aspect of the present invention includes the positive electrode. As the energy storage device includes a positive electrode containing the positive active material, it is possible to diminish an increase in resistance of the energy storage device after being stored in a high temperature environment.

An energy storage apparatus according to an aspect of the present invention includes two or more energy storage devices and one or more energy storage devices according to an aspect of the present invention. As the energy storage apparatus includes the energy storage device according to an aspect of the present invention, it is possible to diminish an increase in resistance of the energy storage apparatus after being stored in a high temperature environment.

In the present specification, an oxidation reaction in which ions (lithium ions in the case of lithium ion nonaqueous electrolyte energy storage device) involved in the charge-discharge reaction are released from the positive active material is referred to as "charge", and a reduction reaction in which ions involved in the charge-discharge reaction are stored in the positive active material is referred to as "discharge".

The configuration of a positive active material for energy storage device, the configuration of a positive electrode for energy storage device, the configuration of an energy storage device, the configuration of an energy storage apparatus, a method of manufacturing a positive electrode for energy storage device, and a method of manufacturing an energy storage device according to an embodiment of the present invention, and other embodiments will be described in detail. The names of the respective constituent members (respective constituent elements) used in the respective embodiments may be different from the names of the respective constituent members (respective constituent elements) used in the background art.

Positive Active Material for Energy Storage Device

At least part of the surface of the positive active material for energy storage device (hereinafter, simply referred to as a positive active material) is coated with carbon.

The positive active material is a compound represented by the following Formula 1.

$$LiFe_xMn_{(1-x)}PO_4 (0 \le x \le 1) \quad 1$$

The compound represented by Formula 1 is a phosphate compound containing iron, manganese, or a combination thereof and lithium. The compound represented by Formula 1 has an olivine-type crystal structure. A compound having an olivine-type crystal structure has a crystal structure attributable to space group Pnma. The crystal structure attributable to space group Pnma means having a peak attributable to space group Pnma in an X-ray diffraction diagram. Since the compound represented by Formula 1 is a polyanion salt in which a reaction for oxygen extraction from a crystal lattice does not easily proceed, the compound has high safety and is inexpensive.

Examples of the positive active material include lithium iron phosphate ($LiFePO_4$), lithium manganese phosphate ($LiMnPO_4$), lithium manganese iron phosphate ($LiFe_xMn_{(1-x)}PO_4 (0 \le x \le 1)$) or a combination thereof. As the positive active material contains iron, manganese or a combination thereof as a transition metal element, the charge-discharge capacity can be further increased.

The compound represented by Formula 1 may contain a transition metal element other than iron and manganese and a typical element such as aluminum. However, it is preferable that the compound represented by Formula 1 is substantially composed of iron, manganese or a combination thereof, lithium, phosphorus, and oxygen.

In Formula 1, the upper limit of x is 1, and is preferably 0.95. The lower limit of x is 0, and is preferably 0.25. As the value of x is equal to or less than the upper limit or equal to or more than the lower limit, excellent life characteristics are exhibited. Incidentally, x may be substantially 1.

The average particle size of primary particles of the positive active material is, for example, preferably 0.01 μm or more and 0.20 μm or less, more preferably 0.02 μm or more and 0.10 μm or less. By setting the average particle size of primary particles of the compound represented by Formula 1 to the above range, the diffusibility of lithium ions in the pores of the positive composite layer is improved.

The average particle size of secondary particles of the positive active material is, for example, preferably 3 μm or more and 20 μm or less, more preferably 5 μm or more and 15 μm or less. By setting the average particle size of secondary particles of the compound represented by Formula 1 to the above range, production and handling are facilitated, as well as the diffusibility of lithium ions in the pores of the positive composite layer is improved.

The "average particle size of primary particles" is a value measured through observation under a scanning electron microscope. The "average particle size of secondary particles" means a value at which a volume-based integrated distribution calculated in conformity with JIS-Z-8819-2 (2001) is 50% based on the particle size distribution measured on a diluted solution obtained by diluting particles with a solvent by a laser diffraction/scattering method in conformity with JIS-Z-8825 (2013).

A crusher, a classifier and the like are used to obtain a powder having a predetermined particle size. Examples of the crushing method include a method in which a mortar, a ball mill, a sand mill, a vibratory ball mill, a planetary ball mill, a jet mill, a counter jet mill, a whirling airflow type jet mill, a sieve or the like is used. At the time of crushing, wet type crushing in the presence of water or an organic solvent such as hexane can also be used. As a classification method, a sieve, a pneumatic classifier and the like are used both in dry manner and in wet manner if necessary.

As at least part of the surface of the positive active material is coated with carbon, the electron conductivity can be improved. The content of carbon in the positive active material is preferably 0.5% by mass or more and 5% by mass or less. By setting the content of carbon to the above range, the electrical conductivity can be increased as well as the density of the positive composite layer and thus the capacity of the energy storage device can be increased.

In the positive active material, the lower limit of the ratio of full width at half maximum of the peak in a charged state to the peak in a discharged state is 0.85, preferably 0.88 in the peak corresponding to the (131) plane observed by powder X-ray diffraction using CuKα radiation. Meanwhile, the upper limit of the ratio of full width at half maximum of the peak in a charged state to the peak in a discharged state is 1.13, preferably 1.10. By setting the ratio of full width at half maximum of the peak in a charged state to the peak in a discharged state to be equal to or more than the lower limit and equal to or less than the upper limit, anisotropic expansion that occurs when the positive active material changes from a discharged state to a charged state is suppressed. As a result, it is presumed that current collecting performance of the positive electrode can be favorably maintained. Consequently, the positive active material for energy storage device can diminish an increase in resistance of an energy storage device after being stored in a high temperature environment.

In the peak corresponding to the (131) plane of the positive active material observed by powder X-ray diffraction using CuKα radiation, the upper limit of the full width at half maximum of the peak in a discharge state is preferably 0.170. The lower limit of the full width at half maximum of the peak in a discharge state is preferably 0.110. As the full width at half maximum of the peak in a discharged state is equal to or less than the upper limit and equal to or more than the lower limit, it is possible to improve the power characteristics of an energy storage device in the initial stage.

In the peak corresponding to the (131) plane of the positive active material observed by powder X-ray diffraction using CuKα radiation, the upper limit of the full width at half maximum of the peak in a charged state is preferably 0.185. The lower limit of the full width at half maximum of the peak in a charged state is preferably 0.120. As the full width at half maximum of the peak in a charged state is equal to or less than the upper limit and equal to or more than the lower limit, it is possible to improve the low temperature characteristics of an energy storage device.

The positive active material is attributed to the orthorhombic space group Pnma in the powder X-ray diffraction diagram using CuKα radiation. The full width at half maximum of the peak corresponding to the (131) plane observed by powder X-ray diffraction using CuKα radiation can be acquired from the diffraction peak present at $2\theta=35.6\pm0.5°$ in the X-ray diffraction diagram using CuKα radiation.

The full width at half maximum of the diffraction peak of the positive active material is measured using an X-ray diffractometer (Rigaku Corporation, model: MiniFlex II). Specifically, the measurement is performed according to the following conditions and procedures. Radiation source is CuKα radiation, and acceleration voltage and current are 30 kV and 15 mA, respectively. The sampling width is set to 0.01 deg, the scanning time is set to 14 minutes (scanning speed is set to 5.0), the divergence slit width is set to 0.625 deg, the light receiving slit width is set to open, and the scattering slit is set to 8.0 mm. It is determined by the full width at half maximum output by automatically analyzing the acquired X-ray diffraction data using "PDXL" that is attached software of the X-ray diffractometer. When the X-ray diffraction data is analyzed, the peak derived from Kα2 is not removed.

In the measurement of the full width at half maximum of the diffraction peak in a discharged state of the positive active material, a powder before being charged and discharged of the positive active material before being used in fabrication of the positive electrode is subjected to the measurement as it is.

In a case where a measurement sample is collected from the positive electrode taken out from a disassembled energy storage device, before the energy storage device is disassembled, constant current discharge is performed to a voltage, which is the lower limit of the designated voltage, at a current value (0.1 C) that is 1/10 of the current value to be an amount of electricity equal to the nominal capacity of the energy storage device when the energy storage device is energized at a constant current for 1 hour in an environment of 25° C. The energy storage device is disassembled to take out the positive electrode, a battery using a metal lithium electrode as the counter electrode is assembled, and constant current discharge is performed in an environment of 25° C. at a current value of 10 mA per 1 g of the positive composite until the voltage between terminals of the positive electrode reaches 2.0 V (vs. $Li/Li^+$) to adjust the positive electrode to the completely discharged state. The battery is disassembled again, and the positive electrode is taken out. The positive electrode taken out is sufficiently washed with dimethyl carbonate to remove the electrolyte attached to the positive electrode, and is dried at room temperature for a whole day and night, and the positive composite on the positive substrate is then collected and subjected to the measurement.

Meanwhile, for the measurement of the full width at half maximum of the diffraction peak in a charged state, constant current discharge is performed at a current value of 0.05 C to the lower limit voltage for normal use to adjust the positive electrode to the completely discharged state. The energy storage device is disassembled to take out the positive electrode, a battery using a metal lithium electrode as the counter electrode is assembled, and constant current charge is performed in an environment of at a current value of 0.1 C until the voltage between terminals of the positive electrode reaches 4.1 V (vs. $Li/Li^+$), and then constant voltage charge is performed at a voltage between terminals of the positive electrode of 4.1 V (vs. $Li/Li^+$). With regard to the charge termination conditions, charge is performed until the current value reaches 0.02 C. In this charged state, the battery is disassembled again, and the positive electrode is taken out. The positive electrode taken out is sufficiently washed with dimethyl carbonate to remove the electrolyte attached to the positive electrode, and is dried at room temperature for a whole day and night, and the positive composite on the positive substrate is then collected and subjected to the measurement.

The operations from disassembly of the energy storage device to re-disassembly, and the washing and drying operations of the positive electrode are performed in an argon atmosphere having a dew point of −60° C. or less.

According to the positive active material for energy storage device, it is possible to diminish an increase in resistance of an energy storage device after being stored in a high temperature environment.

Method of Producing Positive Active Material for Energy Storage Device

The positive active material can be produced, for example, based on the following procedure.

First, while a mixed aqueous solution of $FeSO_4$ and $MnSO_4$ at an arbitrary ratio is added dropwise at a constant rate into a reaction case containing ion-exchange water, an aqueous NaOH solution, an aqueous $NH_3$ solution and an aqueous $NH_2NH_2$ solution are added dropwise so that the pH during that time is maintained at a constant value, thereby producing a $Fe_xMn_{(1-x)}(OH)_2$ precursor. Next, the produced $Fe_xMn_{(1-x)}(OH)_2$ precursor is taken out from the reaction case and solid-phase mixed with $LiH_2PO_4$ and sucrose powder. Thereafter, the obtained mixture is calcined at a calcination temperature of 550° C. or more and 750° C. or less in a nitrogen atmosphere to produce a positive active material, which has an olivine-type crystal structure and in which at least part of the surface of a positive active material represented by the following Formula 1 is coated with carbon.

$$LiFe_xMn_{(1-x)}PO_4 (0 \le x \le 1) \qquad 1$$

The full widths at half maximum in a discharged state and a charged state in the peak corresponding to the (131) plane of the positive active material observed by powder X-ray diffraction using CuKα radiation can be adjusted by controlling the respective concentrations of the aqueous NaOH solution and the aqueous $NH_3$ solution in the method of producing the positive active material. The range of the concentration of the aqueous $NH_3$ solution is preferably 0.25 $mol/dm^3$ or more and 1 $mol/dm^3$ or less. When the concentration of the aqueous $NH_3$ solution exceeds 1 $mol/dm^3$, the precursor may not be sufficiently precipitated as the target composition. Meanwhile, in a case where the concentration of the aqueous $NH_3$ solution is less than 0.25 $mol/dm^3$, uniform element distribution in one precursor particle may not be achieved. For this reason, the control of the crystal growth direction may be insufficient, and the full width at half maximum of the peak may not be adjusted to a favorable range. In addition, by using $NH_2NH_2$ as the antioxidant of the precursor, the full width at half maximum of the peak of the positive active material can be adjusted to a favorable range.

In other words, by controlling the pH and $NH_2NH_2$ concentration during the production of the $Fe_xMn_{(1-x)}(OH)_2$ precursor in suitable ranges in the production method using a precursor, the full width at half maximum of the peak of the positive active material can be adjusted to a favorable range.

Positive Electrode for Energy Storage Device

The positive electrode for an energy storage device (hereinafter, also simply referred to as the positive electrode) contains the positive active material. The positive electrode includes a positive substrate and a positive composite layer disposed on the positive substrate directly or with an intermediate layer interposed therebetween.

Positive Substrate

The positive substrate exhibits conductivity. Whether the positive substrate exhibits “conductivity” is determined by the volume resistivity of $10^7$ Ω·cm measured in conformity with JIS-H-0505 (1975) as a threshold. As a material for the positive substrate, a metal such as aluminum, titanium, tantalum, or stainless steel, or any alloy thereof is used. Among these, aluminum or an aluminum alloy is preferable from the viewpoint of resistance to electric potential, degree of conductivity, and cost. Examples of the positive substrate include a foil, a deposited film, a mesh, and a porous material, and a foil is preferable from the viewpoint of cost. Accordingly, the positive substrate is preferably an aluminum foil or an aluminum alloy foil. Examples of the aluminum or aluminum alloy include A1085, A3003, and A1N30 specified in JIS-H-4000 (2014) or JIS-H-4160 (2006).

The average thickness of the positive substrate is preferably 3 μm or more and 50 μm or less, more preferably 5 μm or more and 40 μm or less, still more preferably 8 μm or more and 30 μm or less, particularly preferably 10 μm or more and 25 μm or less. By setting the average thickness of the positive substrate to the above range, it is possible to increase the energy density per volume of the energy storage device while increasing the strength of the positive substrate.

The intermediate layer is a layer disposed between the positive substrate and the positive composite layer. The intermediate layer contains a conductive agent such as carbon particles to lower contact resistance between the positive substrate and the positive composite layer. The configuration of the intermediate layer is not particularly limited, and includes, for example, a binder and a conductive agent.

Positive Composite Layer

The positive composite layer contains the positive active material described above. As the positive electrode includes a positive composite layer containing the positive active material, it is possible to diminish an increase in resistance of an energy storage device after being stored in a high temperature environment. The positive composite layer contains optional components such as a conductive agent, a binder, a thickener, and a filler if necessary.

The positive composite layer may further contain a positive active material other than the positive active material having an olivine-type crystal structure. Such another positive active material can be appropriately selected from known positive active materials, which are usually used for lithium ion secondary batteries and the like. However, the lower limit of the total content of the positive active material having an olivine-type crystal structure in the total positive active materials contained in the positive composite layer is preferably 90% by mass, more preferably 99% by mass. The upper limit of the total content of the positive electrode active material in the total positive electrode active materials may be 100% by mass. By substantially using only the positive active material having an olivine-type crystal structure as the positive active material as described above, the effect of the present invention can be further enhanced.

As a known positive active material for lithium ion secondary battery, a material capable of storing and releasing lithium ions is usually used. Examples of the positive active material include lithium-transition metal composite oxides that have an $\alpha$-$NaFeO_2$-type crystal structure, lithium-transition metal composite oxides that have a spinel-type crystal structure, polyanion compounds, chalcogenides, and sulfur. Examples of the lithium-transition metal composite oxides that have an $\alpha$-$NaFeO_2$-type crystal structure include $Li[Li_xNi_{(1-x)}]O_2$ ($0 \le x \le 0.5$), $Li[Li_xNi_\gamma Co_{(1-x-\gamma)}]O_2$ ($0 \le x < 0.5$, $0 < \gamma < 1$), $Li[Li_xCo_{(1-x)}]O_2$ ($0 \le x < 0.5$), $Li[Li_xNi_\gamma Mn_{(1-x-\gamma)}]O_2$ ($0 \le x < 0.5$, $0 < \gamma < 1$), $Li[Li_xNi_\gamma Mn_\beta Co_{(1-x-\gamma-\beta)}]O_2$ ($0 \le x < 0.5$, $0 < \gamma$, $0 < \beta$, $0.5 < \gamma+\beta < 1$), and $Li[Li_xNi_\gamma Co_\beta Al_{(1-x-\gamma-\beta)}]O_2$ ($0 \le x < 0.5$, $0 < \gamma$, $0 < \beta$, $0.5 < \gamma+\beta < 1$). Examples of the lithium-transition metal composite oxides that have a spinel-type crystal structure include $Li_xMn_2O_4$ and $Li_xNi_\gamma Mn_{(2-\gamma)}O_4$. Examples of the polyanion compounds include $LiNiPO_4$, $LiCoPO_4$, $Li_3V_2(PO_4)_3$, $Li_2MnSiO_4$, and $Li_2CoPO_4F$. Examples of the chalcogenides include titanium disulfide, molybdenum disulfide, and molybdenum dioxide. Some of atoms or polyanions in these materials may be substituted with atoms or anion species composed of other elements. The surfaces of these materials may be coated with other materials. In the positive composite layer, one of these materials may be used singly or two or more thereof may be used in mixture.

The content of the total positive active materials in the positive composite layer is preferably 50% by mass or more and 99% by mass or less, more preferably 70% by mass or more and 98% by mass or less, still more preferably 80% by mass or more and 95% by mass or less. By setting the content of the total positive active materials to the above range, it is possible to achieve both high energy density of the positive active material layer and productivity.

The conductive agent is not particularly limited as long as it is a material exhibiting electrical conductivity. Examples of such a conductive agent include carbonaceous materials, metals, and conductive ceramics. Examples of the carbonaceous materials include graphite, non-graphitic carbon, and graphene-based carbon. Examples of the non-graphitic carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly, or two or more thereof may be used in mixture. These materials may be composited and used. For example, a material obtained by compositing carbon black with CNT may be used. Among these materials, carbon black is preferable from the viewpoint of electron conductivity and coatability, and in particular, acetylene black is preferable.

The content of the conductive agent in the positive composite layer is preferably 0.5% by mass or more and 15% by mass or less, more preferably 1% by mass or more and 10% by mass or less, still more preferably 2% by mass or more and 5% by mass or less. By setting the content of the conductive agent to the above range, the energy density of the energy storage device can be increased.

Examples of the binder include: thermoplastic resins such as fluororesin (polytetrafluoroethylene (PTFE), polyvinylidene fluoride (PVdF), and the like), polyethylene, polypropylene, polyacryl, and polyimide; elastomers such as an ethylene-propylene-diene rubber (EPDM), sulfonated EPDM, styrene butadiene rubber (SBR), and fluororubber; and polysaccharide polymers.

The content of the binder in the positive composite layer is preferably 1% by mass or more and 10% by mass or less, more preferably 3% by mass or more and 9% by mass or less. By setting the content of the binder to the above range, the active material can be stably held.

Examples of the thickener include polysaccharide polymers such as carboxymethylcellulose (CMC) and methylcellulose. In a case where the thickener has a functional group that is reactive with lithium and the like, the functional group may be deactivated by methylation or the like in advance.

The filler is not particularly limited. Examples of the filler include polyolefins such as polypropylene and polyethylene, inorganic oxides such as silicon dioxide, alumina, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, and barium sulfate, nitrides such as aluminum nitride and silicon nitride, and substances derived from mineral resources, such as talc, montmorillonite, boehmite, zeolite, apatite, kaolin, mullite, spinel, olivine, sericite, bentonite and mica, or artificial products thereof.

The positive composite layer may contain a typical nonmetal element such as B, N, P, F, Cl, Br, or I, a typical metal element such as Li, Na, Mg, Al, K, Ca, Zn, Ga, Ge, Sn, Sr, or Ba or a transition metal element such as Sc, Ti, V, Cr, Mn, Fe, Co, Ni, Cu, Mo, Zr, Nb, or W as a component other than the positive active material, the conductive agent, the binder, the thickener, and the filler.

The peak differential pore volume of the positive composite layer is preferably $5 \times 10^{-3}$ $cm^3/(g\ nm)$ or more and $10 \times 10^{-3}$ $cm^3/(g\ nm)$ or less, more preferably $5 \times 10^{-3}$ $cm^3/(g\ nm)$ or more and $8 \times 10^{-3}$ $cm^3/(g\ nm)$ or less. As the peak differential pore volume of the positive composite layer is in the above range, the side reaction between the positive active material and the electrolyte is suppressed, and thus the effect of suppressing an increase in resistance of an energy storage device after being stored in a high temperature environment is favorable.

The peak differential pore volume of the positive composite layer is measured by the following method. In a sample tube for measurement, 1.00 g of powder of a measurement sample is placed, and dried at 120° C. for 6 hours and further at 180° C. for 6 hours under reduced pressure to sufficiently remove the moisture in the measurement sample. Next, by a nitrogen gas adsorption method using liquid nitrogen, isotherms on the adsorption side and the extraction side are measured in a relative pressure P/P0 (P0=about 770 mmHg) range of 0 to 1. The cumulative pore volume curve is then determined through calculation by a BJH method using the isotherm on the extraction side. The value of total pore volume ($cm^3/g$) is acquired from this curve. Next, by linearly differentiating the cumulative pore volume curve, a differential pore volume curve is acquired in which the horizontal axis indicates the pore size (nm) and the vertical axis indicates the differential pore volume ($cm^3/(g\ nm)$). In the present specification, the "peak differential pore volume" refers to the differential pore volume to be the maximum value in the differential pore volume curve. A large "peak differential pore volume" means a large number of pores having a certain pore size.

The peak differential pore volume of the positive composite layer can be adjusted by controlling the pH during the production of $Fe_xMn_{(1-x)}(OH)_2$ precursor in the method of producing the positive active material. The pH range is preferably 8 or more and 10 or less in an environment of 50° C. In the method of producing the positive active material, by using $NH_3$ as a complexing agent and $NH_2NH_2$ as an antioxidant, the peak differential pore volume of the positive composite layer can be set to a favorable range.

Energy Storage Device

An energy storage device according to an embodiment of the present invention includes an electrode assembly including the positive electrode, a negative electrode, and a separator; a nonaqueous electrolyte; and a case that houses the electrode assembly and the nonaqueous electrolyte. The electrode assembly is typically a stacked type obtained by stacking a plurality of positive electrodes and a plurality of negative electrodes with a separator interposed therebetween, or a wound type obtained by winding a positive electrode and a negative electrode stacked with a separator interposed therebetween. The nonaqueous electrolyte is present to be impregnated in the positive electrode, the negative electrode, and the separator. A nonaqueous electrolyte secondary battery (hereinafter, also simply referred to as a "secondary battery") will be described as an example of the energy storage device.

Positive Electrode

The positive electrode included in the energy storage device is as described above. As the energy storage device includes a positive electrode containing the positive active material, it is possible to diminish an increase in resistance of the energy storage device after being stored in a high temperature environment.

Negative Electrode

The negative electrode includes a negative substrate and a negative composite layer disposed on the negative substrate directly or with an intermediate layer interposed therebetween. The configuration of the intermediate layer is not particularly limited, and for example, can be selected from the configurations exemplified for the positive electrode.

The negative substrate exhibits electrical conductivity. As the material for the negative substrate, a metal such as copper, nickel, stainless steel, nickel-plated steel, or aluminum, any alloy thereof, a carbonaceous material, or the like is used. Among these, copper or a copper alloy is preferable. Examples of the negative substrate include a foil, a deposited film, a mesh, and a porous material, and a foil is preferable from the viewpoint of cost. Accordingly, the negative substrate is preferably a copper foil or a copper alloy foil. Examples of the copper foil include a rolled copper foil and an electrolytic copper foil.

The average thickness of the negative substrate is preferably 2 μm or more and 35 μm or less, more preferably 3 μm or more and 30 μm or less, still more preferably 4 μm or more and 25 μm or less, particularly preferably 5 μm or more and 20 μm or less. By setting the average thickness of the negative substrate to the above range, it is possible to enhance the energy density per volume of a secondary battery while increasing the strength of the negative substrate.

The negative composite layer contains a negative active material. The negative composite layer contains optional components such as a conductive agent, a binder, a thickener, and a filler if necessary. The optional components such as a conductive agent, a binder, a thickener, and a filler can be selected from the materials exemplified for the positive electrode.

The negative composite layer may contain a typical nonmetal element such as B, N, P, F, Cl, Br, or I, a typical metal element such as Li, Na, Mg, Al, K, Ca, Zn, Ga, Ge, Sn, Sr, or Ba or a transition metal element such as Sc, Ti, V, Cr, Mn, Fe, Co, Ni, Cu, Mo, Zr, Ta, Hf, Nb, or W as a component other than the negative active material, the conductive agent, the binder, the thickener, and the filler.

The negative active material can be appropriately selected from known negative active materials. As the negative active material for lithium ion secondary battery, a material capable of storing and releasing lithium ions is usually used. Examples of the negative active material include metal Li; metals or metalloids such as Si and Sn; metal oxides or metalloid oxides such as Si oxide, Ti oxide, and Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (easily graphitizable carbon or hardly graphitizable carbon). Among these materials, graphite and non-graphitic carbon are preferable. In the negative composite layer, one of these materials may be used singly or two or more thereof may be used in mixture.

The term "graphite" refers to a carbon material in which an average lattice spacing ($d_{002}$) of a (002) plane determined by X-ray diffraction before charge-discharge or in a discharged state is 0.33 nm or more and less than 0.34 nm. Examples of the graphite include natural graphite and artificial graphite. Artificial graphite is preferable from the viewpoint that a material having stable physical properties can be procured.

The term "non-graphitic carbon" refers to a carbon material in which the average lattice spacing ($d_{002}$) of a (002) plane determined by X-ray diffraction before charge-discharge or in the discharged state is 0.34 nm or more and 0.42 nm or less. Examples of the non-graphitic carbon include hardly graphitizable carbon and easily graphitizable carbon. Examples of the non-graphitic carbon include a resin-derived material, a petroleum pitch or a material derived from petroleum pitch, a petroleum coke or a material derived from petroleum coke, a plant-derived material, and an alcohol-derived material.

In this regard, the "discharged state" means a state discharged so that lithium ions that can be stored and released in association with charge-discharge are sufficiently released from the carbon material as the negative active material. For example, the "discharged state" refers to a state where an open circuit voltage is 0.7 V or more in a monopolar battery in which a negative electrode containing a carbon material as a negative active material is used as a working electrode and metal Li is used as a counter electrode.

The term "hardly graphitizable carbon" refers to a carbon material in which the $d_{002}$ is 0.36 nm or more and 0.42 nm or less.

The term "easily graphitizable carbon" refers to a carbon material in which the $d_{002}$ is 0.34 nm or more and less than 0.36 nm.

The negative active material is typically particles (powder). The average particle size of the negative active material can be, for example, 1 nm or more and 100 μm or less. In a case where the negative active material is a carbon material, a titanium-containing oxide, or a polyphosphoric acid compound, the average particle size thereof may be 1 μm or more and 100 μm or less. In a case where the negative active material is Si, Sn, an oxide of Si, an oxide of Sn, or the like, the average particle size thereof may be 1 nm or more and 1 μm or less. By setting the average particle size of the negative active material to be equal to or more than the lower limit, the negative active material is easily produced or handled. By setting the average particle size of the negative active material to be equal to or less than the upper limit, the electron conductivity of the negative composite layer is improved. A crusher, a classifier and the like are used to obtain a powder having a predetermined particle size. The crushing method and the powder classification method can be selected from, for example, the methods exemplified for the positive electrode. In a case where the negative active material is a metal such as metal Li, the negative active material may be in the form of a foil.

The content of the negative active material in the negative composite layer is preferably 60% by mass or more and 99% by mass or less, more preferably 90% by mass or more and 98% by mass or less. By setting the content of the negative active material to the above range, it is possible to achieve both high energy density of the negative composite layer and productivity.

Separator

The separator can be appropriately selected from known separators. As the separator, for example, a separator composed of only a substrate layer, a separator in which a heat resistant layer containing heat resistant particles and a binder is formed on one surface or both surfaces of the substrate layer, or the like can be used. Examples of the form of the substrate layer of the separator include a woven fabric, a nonwoven fabric, and a porous resin film. Among these forms, a porous resin film is preferable from the viewpoint of strength, and a nonwoven fabric is preferable from the viewpoint of liquid retaining properties of the nonaqueous electrolyte. As the material for the substrate layer of the separator, for example, a polyolefin such as polyethylene or polypropylene is preferable from the viewpoint of shutdown function, and polyimide, aramid or the like is preferable from the viewpoint of resistance to oxidation and decomposition. As the substrate layer of the separator, a material obtained by combining these resins may be used.

The heat resistant particles contained in the heat resistant layer preferably have a mass loss of 5% or less when the temperature is raised from room temperature to 500° C. in the air atmosphere of 1 atm, and more preferably have a mass loss of 5% or less when the temperature is raised from room temperature to 800° C. Inorganic compounds can be mentioned as materials whose mass loss is equal to or less than the predetermined value. Examples of the inorganic compounds include oxides such as iron oxide, silicon oxide, aluminum oxide, titanium dioxide, zirconium oxide, calcium oxide, strontium oxide, barium oxide, magnesium oxide and aluminosilicate; nitrides such as aluminum nitride and silicon nitride; carbonates such as calcium carbonate; sulfates such as barium sulfate; hardly soluble ionic crystals such as calcium fluoride, barium fluoride, barium titanate; covalently bonded crystals such as silicon and diamond; and substances derived from mineral resources, such as talc, montmorillonite, boehmite, zeolite, apatite, kaolin, mullite, spinel, olivine, sericite, bentonite and mica, and artificial products thereof. As the inorganic compounds, a simple substance or a complex of these substances may be used singly, or two or more thereof may be used in mixture. Among these inorganic compounds, silicon oxide, aluminum oxide, or aluminosilicate is preferable from the viewpoint of safety of the energy storage device.

A porosity of the separator is preferably 80% by volume or less from the viewpoint of strength, and is preferably 20% by volume or more from the viewpoint of discharge performance. The term "porosity" herein is a volume-based value, and means a value measured using a mercury porosimeter.

As the separator, a polymer gel composed of a polymer and a nonaqueous electrolyte may be used. Examples of the polymer include polyacrylonitrile, polyethylene oxide, polypropylene oxide, polymethyl methacrylate, polyvinyl acetate, polyvinylpyrrolidone, and polyvinylidene fluoride. The use of the polymer gel affords the effect of suppressing liquid leakage. As the separator, a polymer gel may be used in combination with a porous resin film, a nonwoven fabric, or the like as described above.

Nonaqueous Electrolyte

The nonaqueous electrolyte can be appropriately selected from known nonaqueous electrolytes. As the nonaqueous electrolyte, a nonaqueous electrolyte solution may be used. The nonaqueous electrolyte solution contains a nonaqueous solvent and an electrolyte salt dissolved in the nonaqueous solvent.

The nonaqueous solvent can be appropriately selected from known nonaqueous solvents. Examples of the nonaqueous solvent include cyclic carbonates, chain carbonates, carboxylic acid esters, phosphoric acid esters, sulfonic acid esters, ethers, amides, and nitriles. As the nonaqueous solvent, those in which some hydrogen atoms contained in these compounds are substituted with halogen may be used.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, 1-phenylvinylene carbonate, and 1,2-diphenylvinylene carbonate. Among these, EC is preferable.

Examples of the chain carbonate include diethyl carbonate (DEC), dimethyl carbonate (DMC), ethyl methyl carbonate (EMC), diphenyl carbonate, trifluoroethyl methyl carbonate, and bis(trifluoroethyl)carbonate. Among these, EMC is preferable.

As the nonaqueous solvent, it is preferable to use the cyclic carbonate or the chain carbonate, and it is more preferable to use the cyclic carbonate and the chain carbonate in combination. By using a cyclic carbonate, dissociation of the electrolyte salt can be promoted to improve ionic conductivity of the nonaqueous electrolyte solution. By using a chain carbonate, the viscosity of the nonaqueous electrolyte solution can be kept low. In a case where a cyclic carbonate and a chain carbonate are used in combination, a volume ratio of the cyclic carbonate to the chain carbonate (cyclic carbonate:chain carbonate) is preferably in a range from 5:95 to 50:50, for example.

The electrolyte salt can be appropriately selected from known electrolyte salts. Examples of the electrolyte salt include a lithium salt, a sodium salt, a potassium salt, a magnesium salt, and an onium salt. Among these, a lithium salt is preferable.

Examples of the lithium salt include inorganic lithium salts such as $LiPF_6$, $LiPO_2F_2$, $LiBF_4$, $LiClO_4$, and $LiN(SO_2F)_2$, lithium oxalates such as lithium bis(oxalate)borate (LiBOB), lithium difluorooxalatoborate (LiDFOB), and lithium bis(oxalate)difluorophosphate (LiFOP), and lithium salts having a halogenated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$. Among these, an inorganic lithium salt is preferable, and $LiPF_6$ is more preferable.

The content of the electrolyte salt in the nonaqueous electrolyte solution is, at 20° C. and 1 atm, preferably 0.1 mol/dm$^3$ or more and 2.5 mol/dm$^3$ or less, more preferably 0.3 mol/dm$^3$ or more and 2.0 mol/dm$^3$ or less, still more preferably 0.5 mol/dm$^3$ or more and 1.7 mol/dm$^3$ or less, particularly preferably 0.7 mol/dm$^3$ or more and 1.5 mol/dm$^3$ or less. By setting the content of the electrolyte salt to the above range, the ionic conductivity of the nonaqueous electrolyte solution can be increased.

The nonaqueous electrolyte solution may contain an additive in addition to the nonaqueous solvent and the electrolyte salt. Examples of the additive include halogenated carbonic acid esters such as fluoroethylene carbonate (FEC) and difluoroethylene carbonate (DFEC); oxalic acid salts such as lithium bis(oxalate)borate (LiBOB), lithium difluorooxalatoborate (LiDFOB), and lithium bis(oxalate)difluorophosphate (LiFOP); imide salts such as lithium bis(fluorosulfonyl)imide (LiFSI); aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial halides of the aromatic compounds such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; vinylene carbonate, methylvinylene carbonate, ethylvinylene carbonate, succinic anhydride, glutaric anhydride, maleic anhydride, citraconic anhydride, glutaconic anhydride, itaconic anhydride, cyclohexanedicarboxylic anhydride; ethylene sulfite, propylene sulfite, dimethyl sulfite, methyl methanesulfonate, busulfan, methyl toluenesulfonate, dimethyl sulfate, ethylene sulfate, sulfolane, dimethyl sulfone, diethyl sulfone, dimethyl sulfoxide, diethyl sulfoxide, tetramethylene sulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, 1,3-propene sultone, 1,3-propane sultone, 1,4-butane sultone, 1,4-butene sultone, perfluorooctane, tristrimethylsilyl borate, tristrimethylsilyl phosphate, tetrakistrimethylsilyl titanate, lithium monofluorophosphate, and lithium difluorophosphate. One of these additives may be used singly, or two or more thereof may be used in mixture.

The content of the additive contained in the nonaqueous electrolyte solution is preferably 0.01% by mass or more and 10% by mass or less, more preferably 0.1% by mass or more and 7% by mass or less, still more preferably 0.2% by mass or more and 5% by mass or less, particularly preferably 0.3% by mass or more and 3% by mass or less with respect to the mass of the entire nonaqueous electrolyte solution. By setting the content of the additive to the above range, it is possible to improve the capacity retention performance or cycle performance after high-temperature storage, or to further improve the safety.

As the nonaqueous electrolyte, a solid electrolyte may be used, or a nonaqueous electrolyte solution and a solid electrolyte may be used in combination.

The solid electrolyte can be selected from arbitrary materials, which have ionic conductivity and are solid at normal temperature (for example, from 15° C. to 25° C.), such as lithium, sodium and calcium. Examples of the solid electrolyte include sulfide solid electrolytes, oxide solid electrolytes, oxynitride solid electrolytes, and polymer solid electrolytes.

Examples of the sulfide solid electrolyte include $Li_2S—P_2S_5$, $LiI—Li_2S—P_2S_5$, and $Li_{10}Ge—P_2S_{12}$.

The shape of the energy storage device of the present embodiment is not particularly limited, and examples thereof include cylindrical batteries, prismatic batteries, flat batteries, coin batteries and button batteries.

FIG. 1 illustrates an energy storage device 1 as an example of a prismatic battery. FIG. 1 is a view illustrating the inside of a case in a perspective manner. An electrode assembly 2 including a positive electrode and a negative electrode, which are wound with a separator interposed therebetween, is housed in a prismatic case 3. The positive electrode is electrically connected to a positive electrode terminal 4 via a positive electrode lead 41. The negative electrode is electrically connected to a negative electrode terminal 5 via a negative electrode lead 51.

Configuration of Energy Storage Apparatus

The energy storage device of the present embodiment can be mounted as an energy storage apparatus configured by assembling a plurality of energy storage devices 1 on a power source for motor vehicles such as electric vehicles (EV), hybrid vehicles (HEV), and plug-in hybrid vehicles (PHEV), a power source for electronic devices such as personal computers and communication terminals, a power source for power storage, or the like. In this case, the technique of the present invention may be applied to at least one energy storage device included in the energy storage apparatus.

Figure 2:
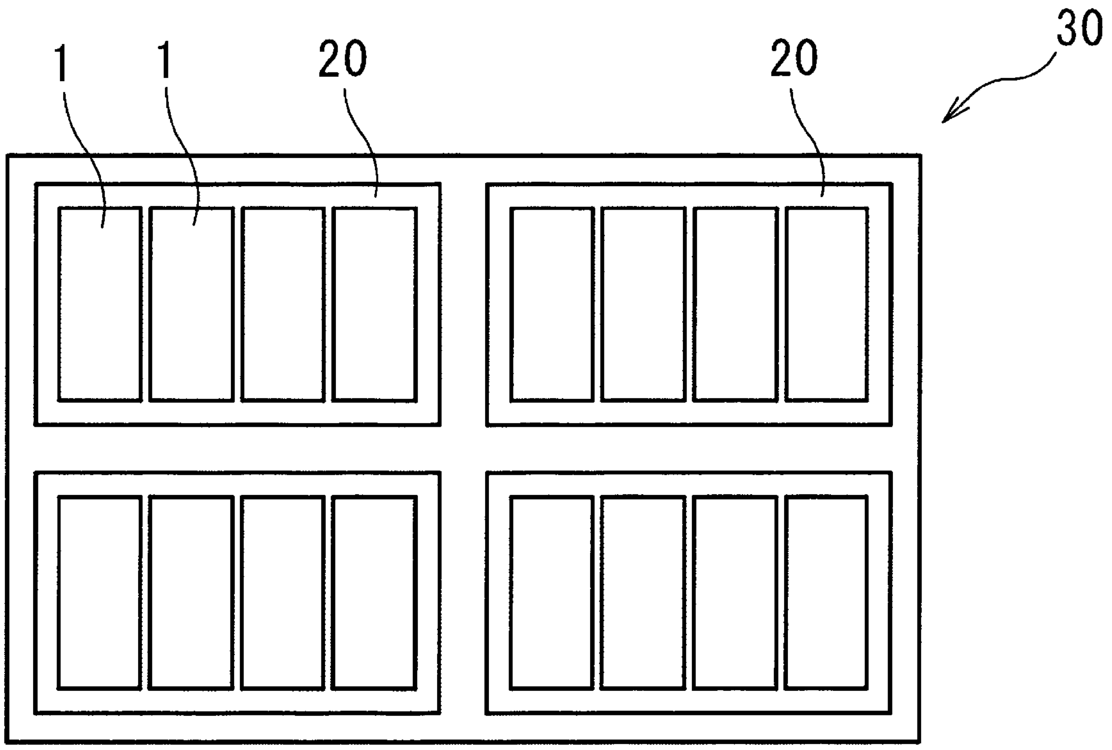
FIG. 2 is a schematic diagram illustrating an embodiment of an energy storage apparatus including a plurality of energy storage devices.

An energy storage apparatus according to an embodiment of the present invention is an energy storage apparatus, which includes two or more energy storage devices and includes one or more energy storage devices according to an embodiment of the present invention. FIG. 2 illustrates an example of an energy storage apparatus 30 formed by assembling energy storage units 20 in each of which two or more electrically connected energy storage devices 1 are assembled. The energy storage apparatus 30 may include a busbar (not illustrated) for electrically connecting two or more energy storage devices 1, a busbar (not illustrated) for electrically connecting two or more energy storage units 20, and the like. The energy storage unit 20 or the energy storage apparatus 30 may include a state monitor (not illustrated) for monitoring the state of one or more energy storage devices.

Method of Manufacturing Energy Storage Device

The energy storage device can be manufactured by a known method except that the positive electrode described above is used as a positive electrode. The method of manufacturing the energy storage device of the present embodiment can be appropriately selected from known methods. The method of manufacturing the energy storage device includes, for example, preparing an electrode assembly, preparing a nonaqueous electrolyte, and housing the electrode assembly and the nonaqueous electrolyte in a case. The preparation of the electrode assembly includes preparing the positive electrode and a negative electrode, and forming an electrode assembly by stacking or winding the positive electrode and the negative electrode with a separator interposed therebetween.

Housing of the nonaqueous electrolyte in a case can be appropriately selected from known methods. For example, in a case where a nonaqueous electrolyte solution is used for the nonaqueous electrolyte, the nonaqueous electrolyte solution may be injected from the inlet formed in the case, and then the inlet may be sealed.

Other Embodiments

The energy storage device of the present invention is not limited to the embodiments described above, and various changes may be made without departing from the scope of the present invention. For example, to the configuration of one embodiment, the configuration of another embodiment can be added, and part of the configuration of one embodiment can be replaced by the configuration of another embodiment or a well-known technique. Furthermore, part of the configuration of one embodiment can be deleted. In addition, a well-known technique can be added to the configuration of one embodiment.

In the embodiments, a case where the energy storage device is used as a nonaqueous electrolyte secondary battery (for example, lithium ion secondary battery) that can be charged and discharged has been described, the type, shape, dimensions, capacity, and the like of the energy storage device are arbitrary. The present invention can also be applied to capacitors such as various secondary batteries, electric double layer capacitors, and lithium ion capacitors.

In the embodiments, an electrode assembly in which a positive electrode and a negative electrode are stacked with a separator interposed therebetween has been described, but the electrode assembly may not include a separator. For example, the positive electrode and the negative electrode may be brought into direct contact with each other in a state in which a layer not exhibiting electrical conductivity is formed on the composite layer of the positive electrode or negative electrode.

EXAMPLES

Hereinafter, the present invention will be described more specifically with reference to Examples. The present invention is not limited to the following Examples.

Examples 1 to 10 and Comparative Examples 1 to 4

(Production of Positive Active Material)

First, while a 1 mol/dm$^3$ aqueous $FeSO_4$ aqueous solution was added dropwise at a constant rate into a 2 dm$^3$ reaction case containing 750 cm$^3$ of ion-exchange water, a 4 mol/dm$^3$ aqueous NaOH solution, a 0.5 mol/dm$^3$ aqueous $NH_3$ solution, and a 0.5 mol/dm$^3$ aqueous $NH_2NH_2$ solution were added dropwise so that the pH during that time was maintained at the value shown in Table 1, thereby producing a $Fe(OH)_2$ precursor. The temperature of the reaction case was set at 50° C. (±2° C.). Next, the prepared $Fe(OH)_2$ precursor was taken out from the reaction case and solid-phase mixed with $LiH_2PO_4$ and sucrose powder. Thereafter, the obtained mixture was calcined in a nitrogen atmosphere, thereby producing a positive active material in which the entire surface of the positive active material $LiFePO_4$ represented by Formula 1 was coated with carbon.

Figure 3A:
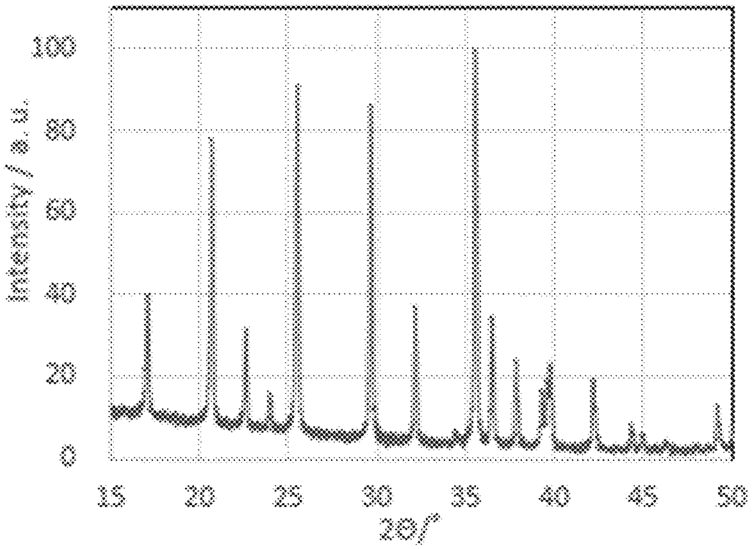
FIG. 3A is a powder X-ray diffraction diagram using CuKα radiation in a discharged state in Example 1.
Figure 3B:
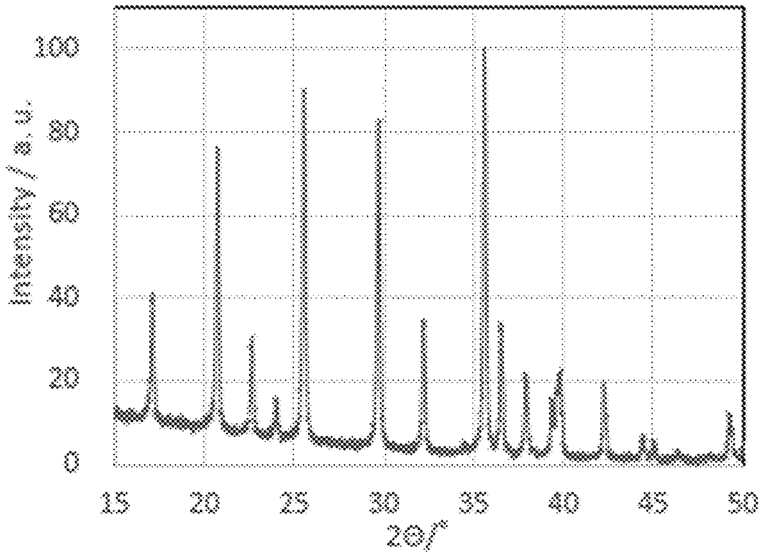
FIG. 3B is a powder X-ray diffraction diagram using CuKα radiation in a charged state in Example 1.

Table 1 shows the pH during the production of precursor in the production of positive active materials ($LiFePO_4$) of Examples 1 to 10 and Comparative Examples 1 to 4, and the ratio of full width at half maximum of the peak in a charged state to the peak in a discharged state in the peak corresponding to the (131) plane observed by powder X-ray diffraction using CuKα radiation. FIG. 3A shows peaks in a powder X-ray diffraction diagram using CuKα radiation in a discharged state in Example 1. FIG. 3B shows peaks in a powder X-ray diffraction diagram using CuKα radiation in a charged state in Example 1. The full width at half maximum of the peak was measured by the method described above.

(Fabrication of Positive Electrode)

N-Methylpyrrolidone (NMP) was used as a dispersion medium, and the positive active materials of Examples 1 to 10 and Comparative Examples 1 to 4 were used as a positive active material, acetylene black (AB) was used as a conductive agent, and polyvinylidene fluoride (PVdF) was used as a binder. The positive active material, the conductive agent, the binder and the dispersion medium were mixed together. At that time, the mass ratio of solid components, positive active material:conductive agent:binder was set to 80:12.5:7.5 in Example 1, to 87.5:7.5:5 in Example 4, and 85:10:5 in the other Examples and Comparative Examples. An appropriate amount of NMP was added to the obtained mixture to adjust the viscosity, thereby preparing a positive composite paste. Next, the positive composite paste was applied to both surfaces of an aluminum foil as a positive substrate, leaving a non-applied portion (positive composite layer non-formed portion), and dried at 120° C., and roll pressing was performed to form a positive composite layer on the positive substrate. The amount of the positive composite paste applied was set to 10 mg/cm$^2$ based on the solid components. In this manner, positive electrodes of Examples 1 to 10 and Comparative Examples 1 to 4 were obtained.

The peak differential pore volume of the positive composite layer was measured by the method described above. Table 1 shows the peak differential pore volume of the positive composite layer.

(Fabrication of Negative Electrode)

Graphite was used as a negative active material, SBR was used as a binder, and CMC was used as a thickener. The negative active material, the binder, the thickener, and water as a dispersion medium were mixed together. At that time, the mass ratio of solid components, negative active material: binder:thickener was set to 97:2:1. An appropriate amount of water was added to the obtained mixture to adjust the viscosity, thereby preparing a negative composite paste. The negative composite paste was applied to both surfaces of a copper foil as a negative substrate, leaving a non-applied portion (negative active material layer non-formed portion), and dried to form a negative composite layer. Thereafter, roll pressing was performed to fabricate a negative electrode.

(Preparation of Nonaqueous Electrolyte)

$LiPF_6$ was dissolved at a concentration of 1 mol/dm$^3$ in a mixed solvent in which EC and EMC were mixed at a volume ratio of 3:7 to prepare a nonaqueous electrolyte.

(Fabrication of Energy Storage Device)

Next, the positive electrode and the negative electrode were stacked with a separator, which was composed of a polyethylene porous membrane substrate and an inorganic layer formed on the polyethylene porous membrane substrate, interposed therebetween to fabricate an electrode assembly. The inorganic layer was disposed on the surface facing the positive electrode. The electrode assembly was housed into an aluminum prismatic case, and a positive electrode terminal and a negative electrode terminal were attached. The nonaqueous electrolyte was injected into the prismatic case, and then the inlet was sealed to obtain energy storage devices of Examples and Comparative Examples.

(Power Retention Ratio after Storage in High Temperature Environment)

(1) A power performance test at SOC (State of Charge) 50% was performed on each of the energy storage devices. Constant current charge was performed to 3.6 V at a charge current of 0.1 C in an environment of 25° C., and then constant voltage charge was performed at 3.6 V. With regard to the charge termination conditions, charge was performed until the charge current reached 0.02 C. After charge, a pause time of 10 minutes was provided, then constant current discharge was performed to 2.0 V at a discharge current of 0.1 C in an environment of 25° C., the "discharge capacity at 0.1 C in an environment of 25° C." was measured, and this amount of electricity was set as SOC100% and the amount of electricity to be a half of this "discharge capacity at 0.1 C in an environment of 25° C." was set as "initial SOC50%". Next, constant current charge was performed so that the energy storage device was charged from the completely discharged state to an amount of electricity to be initial SOC50% at a charge current of C. Thereafter, the discharge was performed at a discharge current of C for 30 seconds, a pause time of 10 minutes was provided, and then auxiliary charge was performed at a charge current of 0.1 C for 30 seconds. Next, the discharge and auxiliary charge were performed in the same manner except that the discharge current was changed to 0.3 C and 0.5 C and the auxiliary charge time was set to the time at which SOC50% was achieved. The V-I characteristics were drawn by plotting the voltage at the 10th second after the start of discharge in each discharge and the discharge current at that time. In the V-I characteristics, linear approximation was performed using the least squares method, then the maximum power current value corresponding to the end-of-discharge voltage was calculated, and further the maximum power current value and the end-of-discharge voltage were multiplied, thereby determining the "power at initial SOC50%". The end-of-discharge voltage was set to 2.0 V.

(2) Next, on each of the energy storage devices, constant current charge was performed to 3.6V at a charge current of 0.1 C, and then constant voltage charge was performed at 3.6 V. With regard to the charge termination conditions, charge was performed until the charge current reached 0.02 C. The energy storage devices were thus charged to SOC100%, and then left to stand in a thermostatic chamber at 85° C. for 14 days. After 14 days had elapsed, each of the energy storage devices was left to stand in an environment of 25° C. for 3 hours, then constant current discharge was performed to 2.0 V at a discharge current of 0.1 C, and the discharge capacity was calculated. Next, the amount of electricity to be a half of this was set as "SOC50% after storage in a high temperature environment", constant current charge was performed at a charge current of 0.1 C so that the amount of electricity of SOC50% after storage in a high temperature environment was charged. After that, the V-I characteristics were drawn in the same manner as above, and the "power at SOC50% after storage in a high temperature environment" was determined.

(3) By dividing the power at SOC50% after storage in a high temperature environment by the power at initial SOC50% and multiplying the quotient by 100, the power retention ratio (%) after storage in a high temperature environment was calculated. The results are shown in Table 1.

TABLE 1

| | $LiFePO_4$ synthesis condition pH of precursor | Positive active material F(131) ratio of charge phase/discharge phase | Positive composite layer Peak differential pore volume [$10^{-3}$ $cm^3/(g \cdot nm)$] | Effect Power retention ratio after storage in high temperature environment [%] |
|---|---|---|---|---|
| Comparative Example 1 | 8.1 | 0.75 | 8 | 67 |
| Comparative Example 2 | 8.3 | 0.79 | 8 | 68 |
| Example 1 | 8.5 | 0.85 | 10 | 81 |
| Example 2 | 8.5 | 0.85 | 8 | 82 |
| Example 3 | 8.5 | 0.85 | 6 | 82 |
| Example 4 | 8.5 | 0.85 | 5 | 82 |
| Example 5 | 8.7 | 0.88 | 8 | 83 |
| Example 6 | 8.9 | 0.92 | 8 | 83 |
| Example 7 | 9.1 | 0.98 | 8 | 83 |
| Example 8 | 9.3 | 1.04 | 8 | 83 |
| Example 9 | 9.5 | 1.10 | 8 | 82 |
| Example 10 | 10.0 | 1.13 | 8 | 80 |
| Comparative Example 3 | 10.5 | 1.16 | 8 | 66 |
| Comparative Example 4 | 11.0 | 1.20 | 8 | 65 |

As shown in Table 1, it has been found that the power retention ratio after storage in a high temperature environment is higher and an increase in resistance after storage in a high temperature environment is further diminished in Examples 1 to 10 in which a positive active material in which at least part of the surface of the positive active material represented by Formula 1 is coated with carbon is contained and the ratio of full width at half maximum of the peak in a charged state to the peak in a discharged state is 0.85 or more and 1.13 or less in the peak corresponding to the (131) plane observed by powder X-ray diffraction using CuKα radiation than in Comparative Examples 1 to 4.

From the results of Examples 1 to 4, it has been found that a favorable effect of diminishing an increase in resistance is exhibited in a range of the peak differential pore volume of the positive composite layer of $5\times10^{-3}$ $cm^3/(g\ nm)$ or more and $10\times10^{-3}$ $cm^3/(g\ nm)$ or less, and a more favorable effect of diminishing an increase in resistance is exhibited particularly in a range of $5\times10^{-3}$ $cm^3/(g\ nm)$ or more and $8\times10^{-3}$ $cm^3/(g\ nm)$ or less.

As a result, it has been indicated that the positive active material can diminish an increase in resistance of an energy storage device after being stored in a high temperature environment. The positive electrode is suitable for a positive electrode for energy storage device used as a power source for electronic devices such as personal computers and communication terminals, motor vehicles, and the like.

DESCRIPTION OF REFERENCE SIGNS

- 1: Energy storage device
- 2: Electrode assembly
- 3: Case
- 4: Positive electrode terminal
- 41: Positive electrode lead
- 5: Negative electrode terminal
- 51: Negative electrode lead
- 20: Energy storage unit
- 30: Energy storage apparatus

The invention claimed is:

1. A positive active material for energy storage device, wherein at least part of a surface is coated with carbon, a ratio of full width at half maximum of a peak in a charged state to a peak in a discharged state is 0.85 or more and 1.13 or less in a peak corresponding to a (131) plane observed by powder X-ray diffraction using CuKα radiation, and the positive active material for energy storage device is a compound represented by the following formula:

$$LiFe_xMn_{(1-x)}PO_4\ (0\le x\le 1).$$

2. The positive active material for energy storage device according to claim 1, wherein the ratio of full width at half maximum is 0.85 or more and 1.10 or less.

3. A positive electrode for energy storage device, comprising a positive composite layer containing the positive active material according to claim 1.

4. The positive electrode for energy storage device according to claim 3, wherein a peak differential pore volume of the positive composite layer is $5\times10^{-3}$ $cm^3/(g\cdot nm)$ or more and $8\times10^{-3}$ $cm^3/(g\cdot nm)$ or less.

5. An energy storage device comprising the positive electrode according to claim 3.

6. An energy storage apparatus comprising two or more energy storage devices and one or more energy storage devices according to claim 5.

7. The positive active material for energy storage device according to claim 1, wherein the compound of the positive active material for energy storage device is $LiFePO_4$.

* * * * *